United States Patent [19]

Howell

[11] Patent Number: 5,081,547

[45] Date of Patent: Jan. 14, 1992

[54] APPARATUS AND METHOD FOR AUTOMATIC ADJUSTMENT OF READ AMPLITUDE THRESHOLD IN A DIGITAL TAPE DRIVE

[75] Inventor: Jones V. Howell, Newport Beach, Calif.

[73] Assignee: Archive Corporation, Costa Mesa, Calif.

[21] Appl. No.: 433,586

[22] Filed: Nov. 8, 1989

[51] Int. Cl.⁵ .................... G11B 27/36; G11B 5/09
[52] U.S. Cl. ....................................... 360/31; 360/46
[58] Field of Search .................. 360/31, 46, 68, 25, 360/53

[56] References Cited

U.S. PATENT DOCUMENTS 4,729,045  3/1988  Baugh ............................. 360/53
4,829,249  5/1989  Matsushita et al. ............. 324/212

OTHER PUBLICATIONS

Bert Vermeulen, et al., "Isn't DAT Special", Mini-Micro Systems, Dec., 1988.
Pete Bramhall, et al., "DAT Data Format Takes Shape", Systems International, Mar., 1988.
Eng Tan, et al., "All Present and Correct", Systems International, Feb., 1988.
Jay Young, et al., "DAT For Data", Systems International, Jan., 1988.

Primary Examiner—Aristotelis Psitos
Assistant Examiner—Won Tae C. Kim

Attorney, Agent, or Firm—Knobbe, Martens, Olson & Bear

[57] ABSTRACT

A digital audio tape (DAT) drive (100) for use with computer systems includes a circuit (130) and a corresponding method for setting the read amplitude threshold for testing written data to determine whether it has a sufficient magnitude to be successfully reproduced. The threshold is set by writing a predetermined data pattern onto a segment of tape (118) to be written with actual data. The predetermined data pattern is selected to comprise pseudo-random ones and zeros so that the reproduced data signals comprise a wide range of frequencies and corresponding amplitudes so that the average amplitude can be determined. The reproduced data signals are sampled and digitized, and the digitized samples are provided as inputs to a microprocessor (250). The microprocessor (250) discards approximately one-half the lowest magnitude data samples so that low amplitude signals caused by media flaws in the test portion of the tape (118) do not affect the method. The microprocessor (150) averages the remaining data samples and computes a threshold value corresponding to a fraction of the calculated average. The computed threshold value is applied to a comparator (256) and is compared with the magnitude of reproduced data signals when reading actual data while performing a read after write operation. The detection of a data signal of lower amplitude than the computed threshold causes a low amplitude signal to be generated and causes a controller (112) to rewrite the corresponding data on a different section of the tape (118).

14 Claims, 6 Drawing Sheets

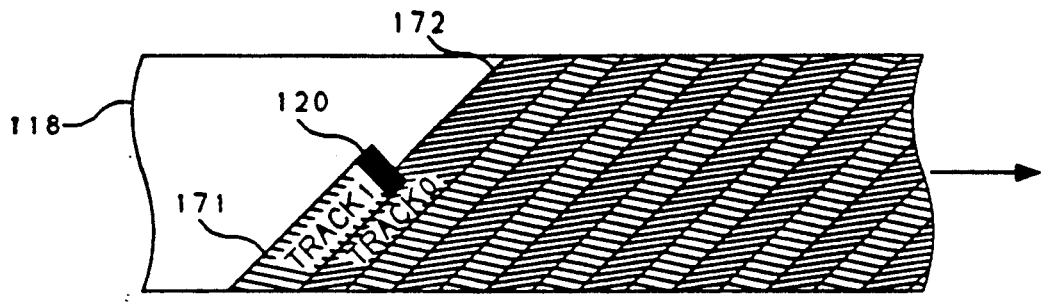
FIG. 4A    FIRST WRITE HEAD ACTIVE
           WRITE TRACK1 AND TRIM TRACK0
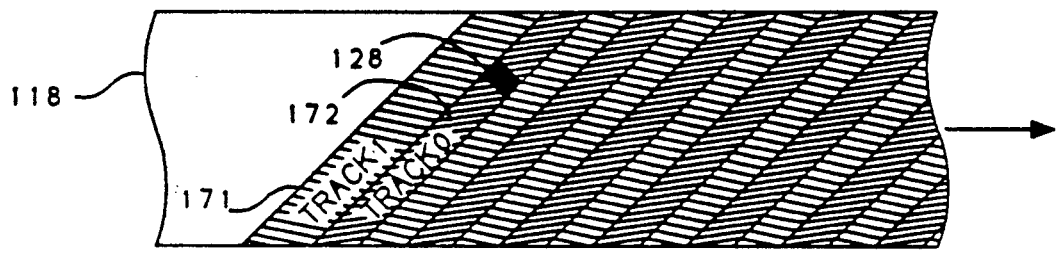
FIG. 4B    SECOND READ HEAD ACTIVE
           READ TRIMMED TRACK0
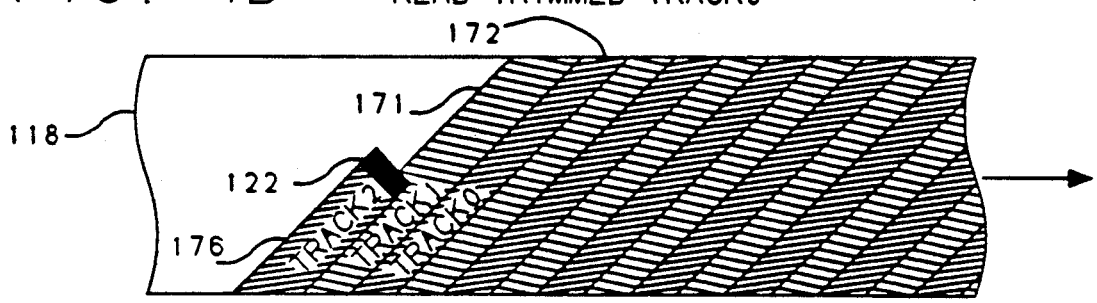
FIG. 4C    SECOND WRITE HEAD ACTIVE
           WRITE TRACK2 AND TRIM TRACK1
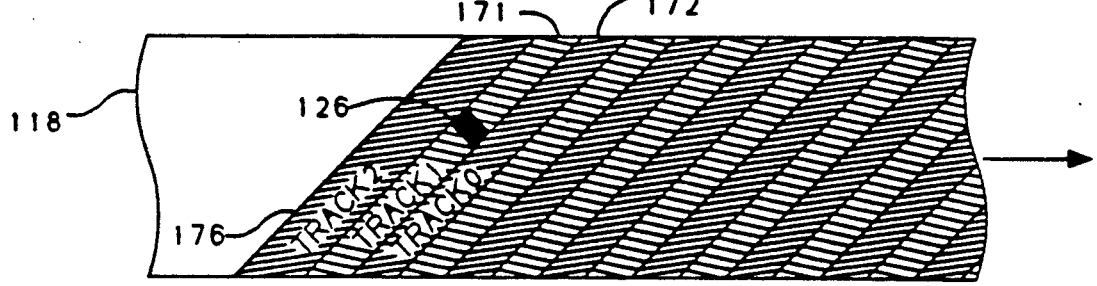
FIG. 4D    FIRST READ HEAD ACTIVE
           READ TRIMMED TRACK1

TRACK FORMAT

EQUALIZER OUTPUT

RECTIFIER OUTPUT

LOW-PASS FILTER OUTPUT

SAMPLE RATE

APPARATUS AND METHOD FOR AUTOMATIC ADJUSTMENT OF READ AMPLITUDE THRESHOLD IN A DIGITAL TAPE DRIVE

BACKGROUND OF THE INVENTION

1. Field of the Invention

The present invention relates to DAT (Digital Audio Tape) recording systems. More specifically, the present invention provides a method for determining a read amplitude threshold which is used to decide when data written to tape should be rewritten for reliability in a read-after-write data-checking process.

2. Description of the Related Art

Although the present invention can be incorporated into other embodiments, it is described as embodied in a helical-scan DAT recording system. As with all magnetic media, the magnetic tape used in DAT recording systems contains some tiny areas where the oxide is not as good as it is in the majority of the tape. If the oxide is sufficiently bad, the area is a media flaw. Media flaws can be caused by foreign particles in the oxide, (such as from cigarette smoke), scratches on the oxide, inclusions which are foreign, molecular-level defects in the oxide, and substrate deformities (such as might be caused by the plastic backing layer of the tape).

When data is written in a media flaw area, the amplitude of the signal reproduced by the read head is reduced and may not be sufficient to correctly reproduce the data that was written onto the tape. Thus, writing in media flaw areas can cause a loss of data. For this reason, certain precautions are taken when writing data to tape so that the data can be recovered.

One generally used technique for insuring the recovery of data that is written to tape is a read-after-write data-checking process. In such a process, data is read immediately after it is written, to determine if it is recoverable. In many systems, a dedicated read head is used so that the data is read immediately after being written. If the data is not recoverable, it is rewritten in a different location on the tape. The nonrecoverable data is usually rewritten in an area closely following the area where the error occurred.

A typical method of determining whether data is recoverable is to use a selected read amplitude threshold during the read portion of the read-after-write process. The read threshold during the read-after-write process is selected to be greater than the read threshold for conventional reading. If the just-written data produces a signal amplitude greater than the read-after-write read threshold, then the data should be recoverable when it is read at the normal read threshold. If the amplitude is below the threshold, the data may not be recoverable and should be rewritten.

Currently, many different methods are used to set the read amplitude threshold. One method is to set a threshold for a particular recording system once by writing on a sample tape and then measuring the read signal amplitude. The problem with this technique is that tapes vary in oxide quality such that nominal amplitudes can vary as much as ±30% from tape to tape. Thus, if a recording system has a threshold set by a tape that produces a low-amplitude data signal, the threshold will be too low for a tape that produces a higher amplitude data signal. Conversely, if the threshold is set for a sample tape that produces high-amplitude signals, the recording system may not be able to accurately reproduce tapes that produce low-amplitude signals. Even if an average tape is tested, other tapes will vary significantly with respect to the levels of signals that they produce.

A second method of setting the threshold is to write and read back a sample written on a given portion (such as the beginning) of each tape. However, there are at least two problems with this second method. One problem is that there may be some media flaws on the tape where the sample is written. If the sample is written in a media flaw area, the read-back signal will have a low amplitude. A threshold value based on this abnormally low signal will be too low, and thus will falsely indicate that signals in a media flaw area are recoverable.

A second problem with this second method is that the actual writing of data will occur at different locations on the tape. For example, different locations on the same tape may have different amounts of oxide caused by the initial manufacturing process or by differences in wear (e.g., the first portion of a tape will generally be used more than other portions of the tape). Since different amounts of oxide produce different nominal amplitudes, different locations on the same tape produce different nominal amplitudes. Therefore, different locations on the same tape will require different amplitude thresholds in order to accurately reproduce the data written thereon. For this reason, it is necessary that the threshold be set at the location on the tape where the user desires to write.

It is an object of the present invention, therefore, to provide a method for setting a threshold that will ensure the reliability of data written to a given area of the tape.

SUMMARY OF THE INVENTION

The present invention provides a method for determining an amplitude threshold to be used in deciding whether data written to magnetic medium should be rewritten in a read-after-write data-checking process because of low read-signal amplitude. Although the method of the present invention can be used in any magnetic media recording system, it is described as embodied in a helical-scan magnetic tape recording system.

In a helical-scan recording system, data is recorded in individual tracks. The first step of the present invention is to write a plurality of amble tracks prior to recording the actual data. The amble tracks are conventionally used to separate groups of data tracks. The data written onto the amble tracks is a pseudo-random pattern that is generated by a passing a frame of zeros through a pseudo-randomizer (e.g., a polynomial generator that starts from a known condition, a "prime polynomial"). The resulting random signal represents an average data pattern and is generally considered to be better than using a specific frequency for the amble.

The next step is to read back the randomized zeroes that have just been written. The reproduced data is rectified and filtered to produce a DC envelope representing the amplitudes of the ones and zeros. N samples of the envelope are taken by an analog-to-digital converter, and the digitized samples are provided as an input to a microprocessor. The microprocessor discards the N/2 lowest amplitude samples to assure that low amplitude signals from a media flaw area are not considered. The highest amplitude N/2 samples are then averaged to generate an average signal magnitude. The digitized average signal is then multiplied by factor in the range of 0.1 to 0.7 to determine the threshold amplitude. Under current technology, a multiplier of 0.5 is used in the best mode of the present invention. The digitized threshold signal is then converted to an analog signal by a digital-to-analog converter connected to the output of the microprocessor.

The threshold amplitude is provided as an input to an analog comparator circuit which compares the DC envelope of the reproduced data with the threshold amplitude. If the data read back is below the threshold amplitude (possibly due to a media flaw), the comparator circuit signals a drive controller to rewrite the data. The rewriting occurs in a conventional manner.

BRIEF DESCRIPTION OF THE DRAWINGS

FIGS. 4A, 4B, 4C and 4D illustrate the process of writing a track while trimming a previously written track and the process of reading a track after it has been trimmed.

DETAILED DESCRIPTION OF THE PREFERRED EMBODIMENT

Figure 1:
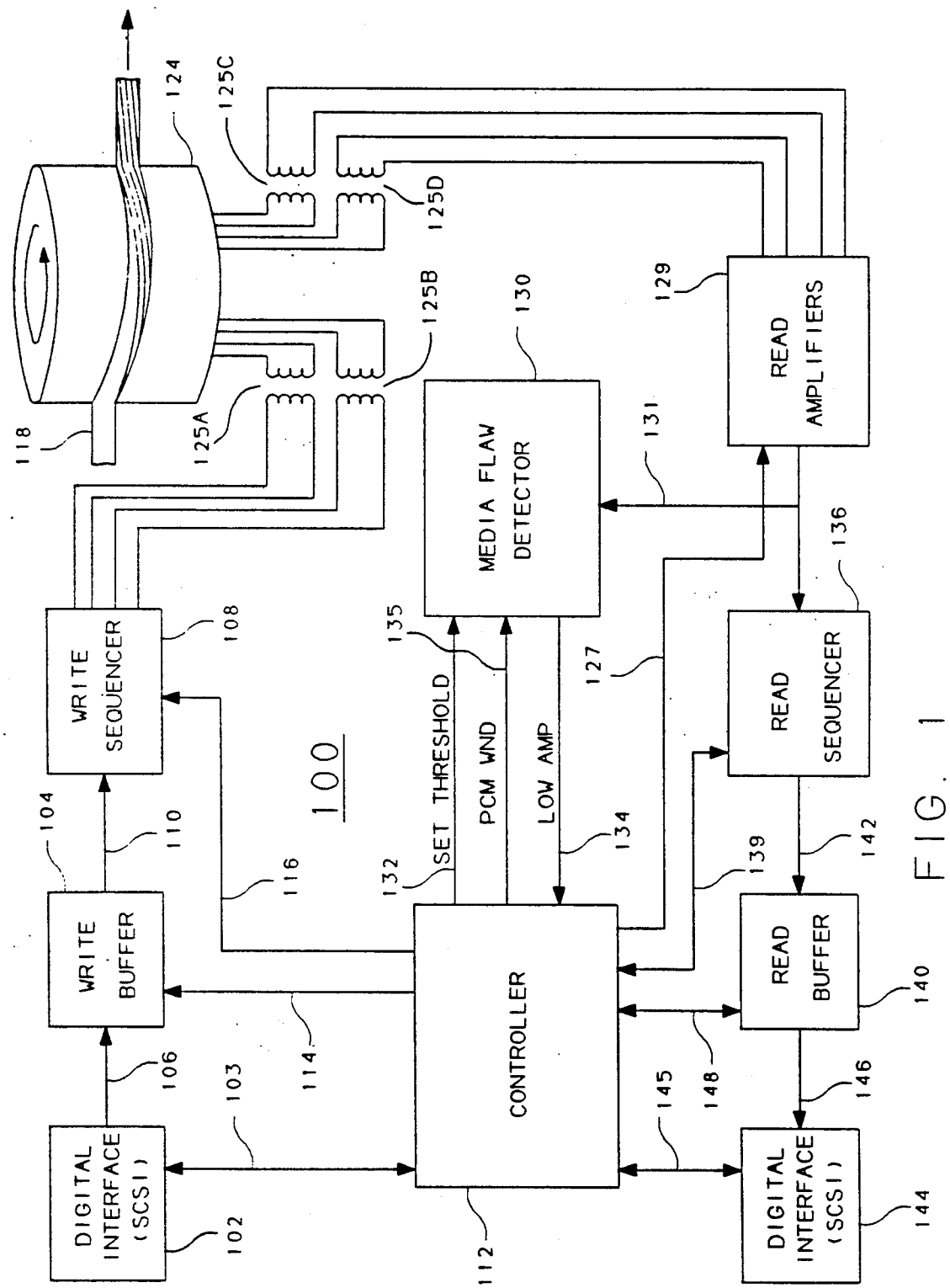
FIG. 1 illustrates a block diagram of a typical helical-scan digital data recording system.
Figure 2:
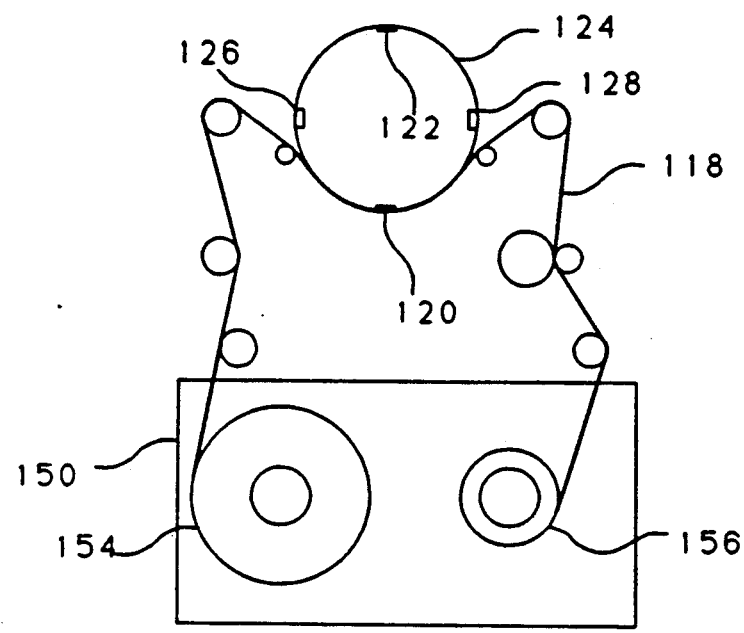
FIG. 2 pictorially illustrates the path of a tape in a cartridge in a typical helical-scan recording system.

A block diagram of an exemplary digital audio tape system 100 for use in computer applications is illustrated in FIG. 1. As illustrated, the system 100 includes a SCSI (Small Computer System Interface) digital input interface 102 that receives digital input data from a computer or the like (not shown). The digital input interface 102 is controlled by a controller 112 via a bus 103. For example, the bus 103 communicates handshake signals between the controller 112 and the digital input interface 102 to inform the controller 112 when data is available via the digital input interface 102 and to inform the digital input interface 102 when the controller 112 has accepted the data. The digital input interface 102 is connected to a buffer 104 via a bus 106. The buffer 104 stores data transferred from the digital input interface 102 and transfers the data to a write sequencer 108 via a bus 110. The buffer 104 transfers the data in response to commands from the controller 112 via a control bus 114. The write sequencer 108 is controlled by the controller 112 via a control bus 116. The data is written on a tape 118 by first and second write heads 120, 122 (FIG. 2). The two write heads 120, 122 are located in a drum 124 around which the tape 118 is wrapped. The write heads 120, 122 are transformer coupled to the write sequencer 108 via a pair of rotating coil transformers 125A and 125B. The write sequencer 108 includes output drive circuits (not shown) that provide current to drive the write heads 120, 122.

Data is read from the tape 118 by first and second read heads 126, 128 (FIG. 2) which are transformer coupled to an amplifier circuit 129 via a pair of rotating coil transformers 125C and 125D. The amplifier circuit 129 is controlled by the controller 112 via a line 127 to selectively provide an amplified output signal from the read head 126 or 128 currently positioned to sense the magnetic flux transitions on the tape 118.

The amplified read head signals are provided from the read amplifier circuit 129 to a media flaw detector circuit 130 via a signal line 131. The media flaw detector circuit 130 operates in accordance with the present invention. The media flaw detector circuit 130 computes and sets an amplitude threshold value when it receives a SET THRESHOLD signal from the controller 112 via a line 132. When operating in a normal read-after-write mode, the media flaw detector circuit 130 will output a LOW AMP signal to the controller 112 via a line 134 when it detects a low read signal amplitude that may be caused by a media flaw area on the tape 118. A PCM WND signal is provided by the controller 112 to the media flaw detector circuit 130 via a line 135 so that the media flaw detector circuit 130 will only verify data read from the PCM data region of a tape track.

The output signals reproduced by the read amplifier circuit 129 are also provided as inputs to a read sequencer 136 via the line 131. The read sequencer 136 is controlled by the controller 112 via a control bus 139. The read sequencer 136 converts the reproduced output signals to digital data and transfers the digital data to a data buffer 140 via a bus 142. The data buffer 140 stores the data transferred from the read sequencer 136 and transfers it to a SCSI digital output interface 144 via a bus 146. The data buffer 140 transfers the data in response to control signals received from the controller 112 via a control bus 148. The SCSI digital output interface 144 transmits digital output data to a computer or the like (not shown). The SCSI digital output interface 144 and the controller 112 communicate via handshake signals in a control bus 145. One skilled in the art will recognize that the SCSI digital input interface 102 and the SCSI digital output interface 142 may comprise a single bidirectional digital interface.

Figure 3:
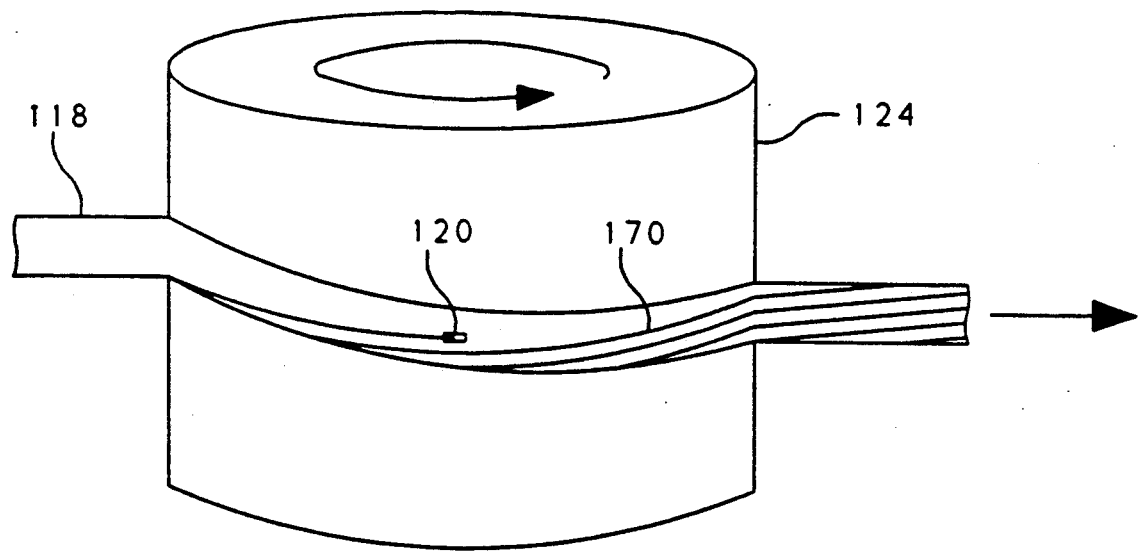
FIG. 3 is a perspective view of an exemplary rotating head drum which illustrates the path of a write head with respect to the tape.

As is well-known in the art, the digital audio tape system utilizes a helical-scan recording technique which is illustrated in FIGS. 2-4. A tape cartridge 150 holds a length of the magnetic recording tape 118 between two reels 154 and 156. The tape 118 is unwound from the first reel 154 and passes proximate to the rotating read-/write head drum 124. As illustrated, the drum 124 supports the write heads 120 and 122 that are positioned on the circumference of the drum at diametrically opposite positions (i.e., 180 degrees apart). The read heads 126 and 128 are disposed between and offset by 90 degrees from the write heads 120, 122. Although not illustrated in FIGS. 2 and 3, the read heads 126, 128 are vertically displaced with respect to the write heads 120, 122 so that they are lower than the write heads (as viewed in FIG. 3).

The tape 118 is positioned with respect to the drum 124 so that the tape 118 is in contact with approximately one-fourth (i.e., 90 degrees) of the circumference of the drum 124. As illustrated more clearly in FIG. 3, the longitudinal path of the tape 118 with respect to the drum 124 is inclined at a shallow angle (e.g., approximately 6 degrees) with respect to the drum 124 so that the combination of the drum rotation and the tape movement cause the write heads 120, 122 to generate helical tracks on the tape 118. The paths of the write heads 120, 122 on the tape 118 are shown by a plurality of lines 170 in FIG. 3. Since the lines 170 represent the paths of the write heads 120, 122 with respect to the tape 118, they also represent the locations of the written data tracks. The tracks are pictorially illustrated in FIGS. 4A–4D. The tracks of the heads on the tape are helixes, and the recording technique is referred to as helical-scan recording.

The data may be recorded on each track of the tape 118 in a variety of formats. One of the most popular helical-scan DAT recording formats is DDS (Digital Data Storage) which was developed by Hewlett-Packard Company and Sony Corporation. In the DDS format, the write head 120 and the read head 126 operate on the same tracks and the write head 122 and the read head 128 operate on the same tracks. Each of the two pairs of write and read heads record data onto and reproduce data from alternating tracks on the tape.

The operation of the first and second write heads 120, 122 and the first and second read heads 126, 128 in writing data onto and reading data from the tape 118 is illustrated pictorially in FIGS. 4A–4D. As illustrated in FIG. 4A, the first write head 120 writes a first track (TRACK1) 171 as the tape 118 moves from left to right and as the drum 124 rotates one-quarter turn (i.e., 90 degrees). As TRACK1 171 is written, the first write head 120 partially overwrites a previously written track (TRACK0) 172 to trim the width of TRACK0 172.

As the tape 118 moves further to the right, as illustrated in FIG. 4B, the drum 124 rotates another 90 degrees during which the second read head 128 is positioned to read TRACK0 172 which has just been trimmed. It can be appreciated that the positioning of the read heads 126, 128 at a lower elevation on the drum 124 allows the read head 128 to traverse TRACK0 172 although it has moved further to the right.

In FIG. 4C, the tape 118 has moved still further to the right. The tape 118 is advanced a sufficient distance so that as the drum 124 rotates through 90 degrees and the second write head 122 writes data onto a second track (TRACK2) 176, approximately one-third of TRACK1 171 is overwritten to trim it to approximately two-thirds of its previous width. Tracks having alternately plus or minus 10 degree azimuth and the isolation it provides allows a full width read head to read a two-thirds width track with negligible interference from the other one-third of the track.

Finally, in FIG. 4D, the tape 118 is moved further to the right so that the first read head 126 is positioned to read TRACK1 172 that has just been trimmed.

As the drum continues to rotate, each write head writes data partly on new tape and partly on the previously written track. The result is a sequence of data tracks with no free space between them. It is this overlapping/trimming which helps give DAT its very high recording density.

In the read-after-write data checking process, the first read head 126 reads the first track written by the first write head 120 after it has been trimmed to its final width by the track written by the second write head 122. Similarly, the second read head 128 reads a track written by the second write head 122 only after it has been trimmed by the first write head 120. Thus, the read portion of the read-after-write operates on the same data that will be read later. If an error is detected or if the signal amplitude read back is below the predetermined threshold and thus not recoverable, the track will be rewritten later on the tape. The nonrecoverable data is usually rewritten in an area closely following the area where the error occurred.

Figure 5:
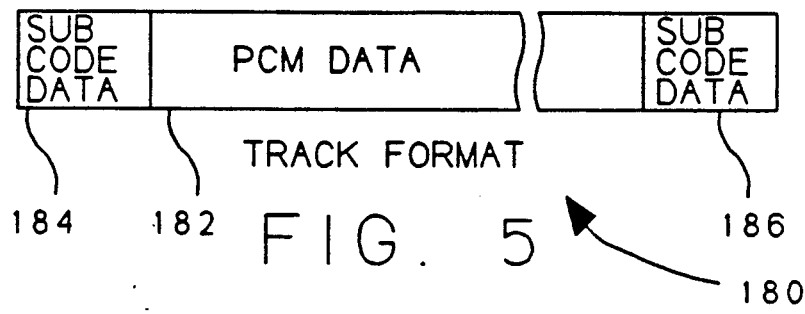
FIG. 5 illustrates the position of sub-code data and PCM data in a track recorded in the DDS format.

FIG. 5 shows the composition of a track 180 recorded in the DDS format. The track 180 has a PCM Data area 182 in the center, and two sub-code (SUBCODE DATA) information areas 184, 186 on respective ends of the PCM Data area 182. The sub-code information areas 184, 186 contain indexing information. The PCM Data area 182 contains the user data. The sub-code data is written in a redundant manner so that it is readily reproducible even at high tape speeds, such as when the tape is searched for index information. Thus, the sub-code data is not critical. On the other hand, the PCM Data is written only a single time, and the data is critical. Because only the PCM Data is non-redundant, the read-after-write data checking is only performed on the PCM Data area 182 in the track 180.

In the DDS format, a set of two data tracks is called a data frame. A set of twenty-two data frames and one error correction code frame is called a group. Each group is separated from the next group by several frames which are called amble frames. The amble frames are used to identify the separation between groups and do not contain reproducible data to be output via the SCSI digital output interface 144.

The present invention comprises a method of writing a test pattern of data onto a portion of tape prior to storing actual data onto that portion of tape. The test pattern is written using a read-after-write process as described above. While writing and reading the test pattern, the reproduced data is sampled by a microprocessor and the sampled reproduced data is used to calculate a threshold value. The calculated threshold value is then used while writing the actual data onto the tape to determine whether the data should be rewritten.

Because the DDS format is the most popular DAT format, the method of the preferred embodiment of the present invention will be described as implemented in the DDS format. It will be apparent to one of ordinary skill in the art that the method of the present invention is readily applicable to other digital tape recording systems.

Figure 6:
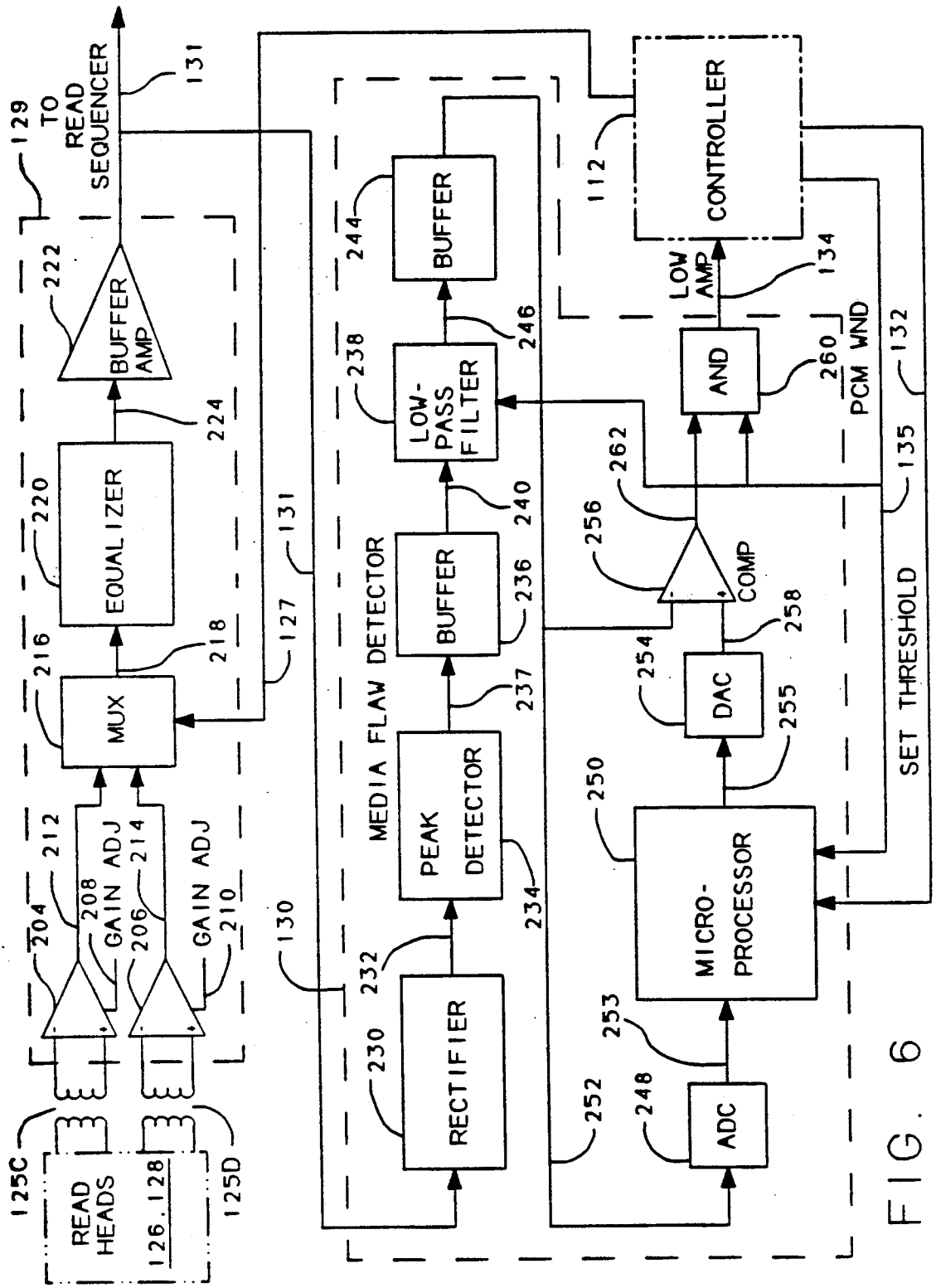
FIG. 6 illustrates a block diagram of a media flaw detector circuit in accordance with the present invention.

FIG. 6 is a block diagram of the media flaw detector circuit 130 in accordance with the present invention. Additional details of a particular embodiment of an exemplary read amplifier circuit 129 are also illustrated in FIG. 6. As discussed above, the read amplifier circuit 129 is transformer coupled to the two tape read heads 126, 128 via the rotating transformer coils 125C and 125D, respectively. The signals generated by the first and second tape read heads 126, 128 are provided as inputs to first and second amplifiers 204, 206, respectively. The two amplifiers 204, 206 both have conventional gain adjustment inputs 208, 210 to provide adjustments to compensate for differences in the second outputs from the two read heads 126, 128. The details of circuits to provide the gain adjustment inputs are not necessary to an understanding of the invention and are not shown in FIG. 6. The amplifiers 204, 206 provide amplified read head output signals on a line 212 and a line 214, respectively.

Figure 7A:
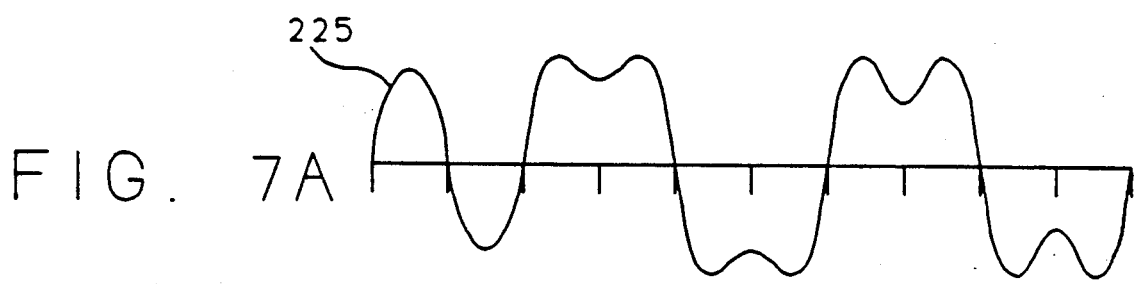
FIGS. 7A, 7B, 7C, and 7D illustrate exemplary waveforms of signals in a media flaw detector circuit.

The lines 212, 214 are provided as inputs to a multiplexer 216. The multiplexer 216 alternately selects between the two inputs according to which data track is currently being read, and provides a signal corresponding to the selected input on a multiplexer output line 218. The controller 112 controls the read head signal to be selected by the multiplexer 216 via a control signal on the control line 127 which is synchronized with the rotation of the drum 124. The multiplexer output line 218 is provided as an input to an equalizer 220. The equalizer 220 compensates for distortion and loss of frequency and phase response in the recording channel (i.e., from the applied digital signal through the recording head 120, 122, the recording media 118, the read head 126, 128, and the read amplifier 204, 206). The equalizer 220 outputs the equalized signals to a buffer amplifier 222 via an equalizer output line 224. FIG. 7A illustrates a waveform 225 which is exemplary of a signal produced by the equalizer 220 on the equalizer output line 224 and buffered by the buffer amplifier 222. This signal is provided as a buffered equalizer output signal on the line 131. As discussed above, the line 131 is connected to the input of the read sequencer 136 and to the input of the media flaw detector circuit 130.

Figure 7B:
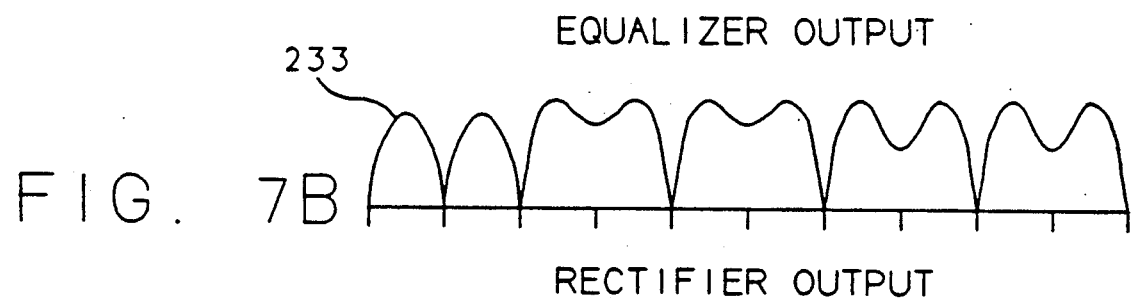

Within the media flaw detector circuit 130, the buffered equalizer output signal on the line 131 is provided as an input to a rectifier 230. The rectifier 230 converts the AC signal on the line 131 to a DC signal that is basically the envelope of the AC signal as illustrated by a waveform 233 in FIG. 7B.

Figure 7C:
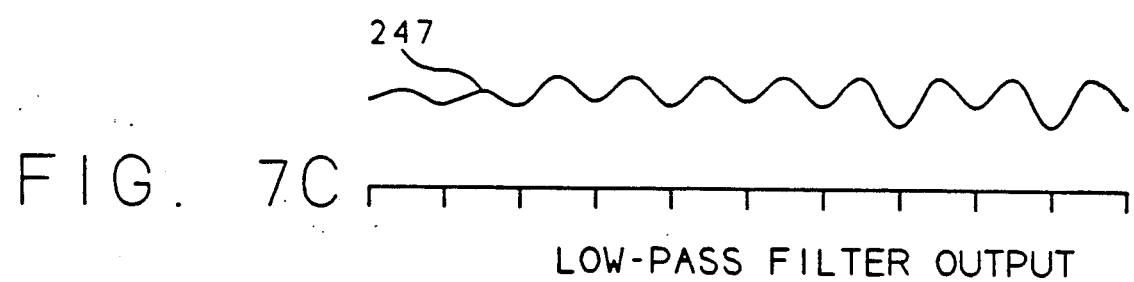

The output from the rectifier 230 is provided as an input to a peak detector 234 via a line 232. The peak detector 234 produces an output signal having an amplitude responsive to the amplitude of the peak of the signal on the line 232. This output signal from the peak detector 234 is input to a buffer 236 via a line 237. The output of the buffer 236 is provided as an input to a low-pass filter 238 via a line 240. The low-pass filter 238 operates to suppress high frequency variations in the input signal and provides a low-pass filter output signal on a line 246 which is illustrated by a waveform 247 in FIG. 7C.

The low-pass filter 238 is controlled by the signal PCM WND (PCM window) on the line 135. The PCM WND signal is active when the read head is in the PCM data area of the track being read. The PCM WND signal is provided as an input to the low-pass filter 238 so that the low-pass filter can be preset to a nominal signal amplitude at the start of the PCM data area to prevent the low-pass filter 238 output from starting out with a media flaw condition such as may occur during the sub-code information portion of each track. The time constant for the low-pass filter 238 should be on the order of 5 to 10 block times. (A typical track has 196 blocks, including the PCM data and the sub-code data).

The low-pass filter 238 output is provided as an input to a buffer 244 via the line 246. The output of the buffer 244 is provided as an input to an analog-to-digital converter (ADC) 248 via a line 252. In a preferred embodiment of the present invention, ADC 248 is an eight-bit analog-to-digital converter. The analog-to-digital converter 248 samples and digitizes the analog signal on the line 252 and provides the digitized samples as inputs the microprocessor 250 via a data bus 253.

Figure 7D:
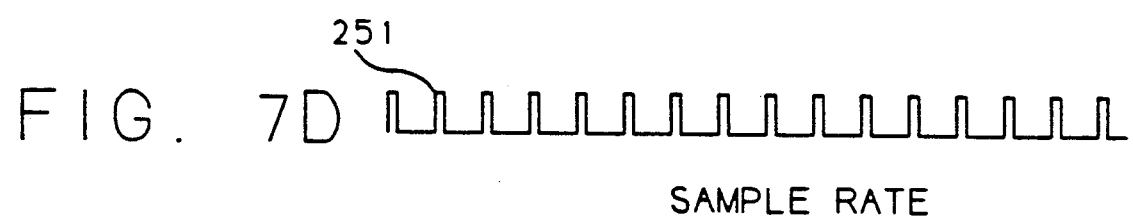

The microprocessor 250 inputs the digitized samples from the ADC 248 during the time that the circuit is reading back the test data written in the PCM data portion of the tracks in the amble frames. The microprocessor 250 receives the PCM WND signal on the line 135 so that the samples are only input during the PCM data portion. FIG. 7D illustrates an exemplary timing diagram comprising a plurality of pulses 251 that correspond to the times when the ADC 248 samples the buffered low-pass filter output signal on the line 252.

The microprocessor 250 is further responsive to a signal SET THRESHOLD which is input to the microprocessor 250 from the controller 112 via the line 132 to indicate to the microprocessor 250 when it is to compute a threshold. As will be described more fully below, this is accomplished by writing a predetermined pattern of test data onto amble tracks of the tape 118 and measuring the amplitude of the buffered low-pass filter output signal on the line 252 when the tracks are sensed by the read heads 126, 128. The data is written onto the tape 118 in a plurality of amble frames. Each amble frame comprises a pattern of all zeros. However, the present invention operates in accordance with the proposed American National Standard for Helical-Scan Digital Computer Tape Cartridge for Information Interchange (ASC X3 Project No. 668-D) which specifies that the data in each frame of user data is randomized in order to provide a consistent RF envelope on the read signal, independent of the data pattern in the frame. Thus, the write sequencer 108 of the present invention includes a conventional randomizer (not shown). The controller 112 operates to cause the write sequencer 108 to transfer a plurality of all zero data frames through its internal randomizer so that a pseudo-random pattern of data is written that effectively includes a range of frequencies such as would be obtained when actual data is written. The range of frequencies results in a range of signal amplitudes which, when rectified, peak detected, filtered and buffered, provides a consistent average amplitude for measurement of the data sensed by the read heads 126, 128 and reproduced by the read amplifier circuit 129.

The microprocessor 250 takes N samples from the signal on the line 252 for each amble track that is read back after writing test data. In the preferred embodiment of the present invention, N is selected to be in the range of 40 to 500 samples. For example, in a particularly preferred embodiment N is selected to be 50. Additional samples may be taken up to the limit of the microprocessor 250 to input and process the samples in the time required to traverse an amble track. As discussed above, the PCM WND signal is provided as an input to the microprocessor 250 so that the microprocessor 250 only inputs samples from the ADC 248 when the read heads 126, 128 are reading data in the PCM Data area of a track.

After the N test pattern data samples have been input into the microprocessor 250, the microprocessor 250 computes the threshold level. The microprocessor 250 excludes from analysis the N/2 lowest amplitude samples so that any samples that may have been read from media flaw regions will be excluded from the computation of the amplitude threshold. For example, it has been found that for commercially available magnetic tape of acceptable quality, a media flaw is unlikely to extend over more than one-half of the PCM data portion of a track. Thus, by excluding the N/2 lowest amplitude samples, any such media flaws will not affect the computed threshold. The microprocessor 250 then computes an average value of the N/2 largest samples. The result is the value of the average amplitude of signals reproduced from usable portions of the section of the tape currently being tested. The average amplitude value of the N samples is in turn used to compute a threshold value to be used when writing and reading actual data on the tape. (As used herein "actual data" means data that is to be saved on the tape 118 and reproduced at a later time, in contrast to the test pattern data written in accordance with the present invention.) The threshold value is calculated by multiplying the average amplitude value by a factor in the range of 0.1 to 0.7.

Under current technology, a multiplier of 0.5 is used in the best mode of the present invention. Under the proposed ANSI format discussed above, any signal less than one-half the average amplitude value may have resulted from a media flaw and the data must be rewritten.

The value of the amplitude threshold is output from the microprocessor 250 to a digital-to-analog converter 254 via a digital bus 255. The digital-to-analog converter 254 provides an analog equivalent of the threshold value to a comparator 256 via a line 258.

During the time when the recording system is writing actual data and verifying the written data through a read-after-write process, the reproduced data signals are input to the comparator 256 via the line 252 and bypass the microprocessor 250. The comparator 256 compares the amplitude of the read data signals with the amplitude threshold output by the digital-to-analog converter 254. If the amplitude of the reproduced data is less than the amplitude threshold (possibly due to a media flaw), then the comparator 256 will output an active signal to an AND gate 260 via a line 262 to indicate that a low amplitude signal has been detected.

The AND gate 260 has a second input which is connected to the PCM WND signal on the line 135. The AND gate 260 provides an active output signal only when the comparator output signal on the line 262 and the PCM WND signal on the line 135 are both active. Since only data in the PCM Data area of a track must be rewritten if the signal amplitude is below the predetermined amplitude threshold, the AND gate 260 will output a high LOW AMP signal only when the read signal amplitude is below the threshold and the read signal comes from the PCM Data area of a track (i.e., when the PCM WND signal is high).

The LOW AMP signal output of the AND gate 260 is provided as an input to the controller 112 via the line 134. When the controller 112 detects a high LOW AMP signal via the line 134, the controller 112 will rewrite the frame (a pair of tracks) of data that was just written. The controller performs this function in a conventional manner. However, in the present invention, the threshold to which the input data is compared in order to determine when to rewrite the data is selected for each portion of tape onto which the data is written This is a significant improvement over the presently available systems in which the threshold is set only once for a particular tape drive and is not varied in accordance with the quality of the tape onto which the data is written or in accordance with changing magnetic characteristics caused by aging of the tape or of the tape drive itself.

Figure 8:
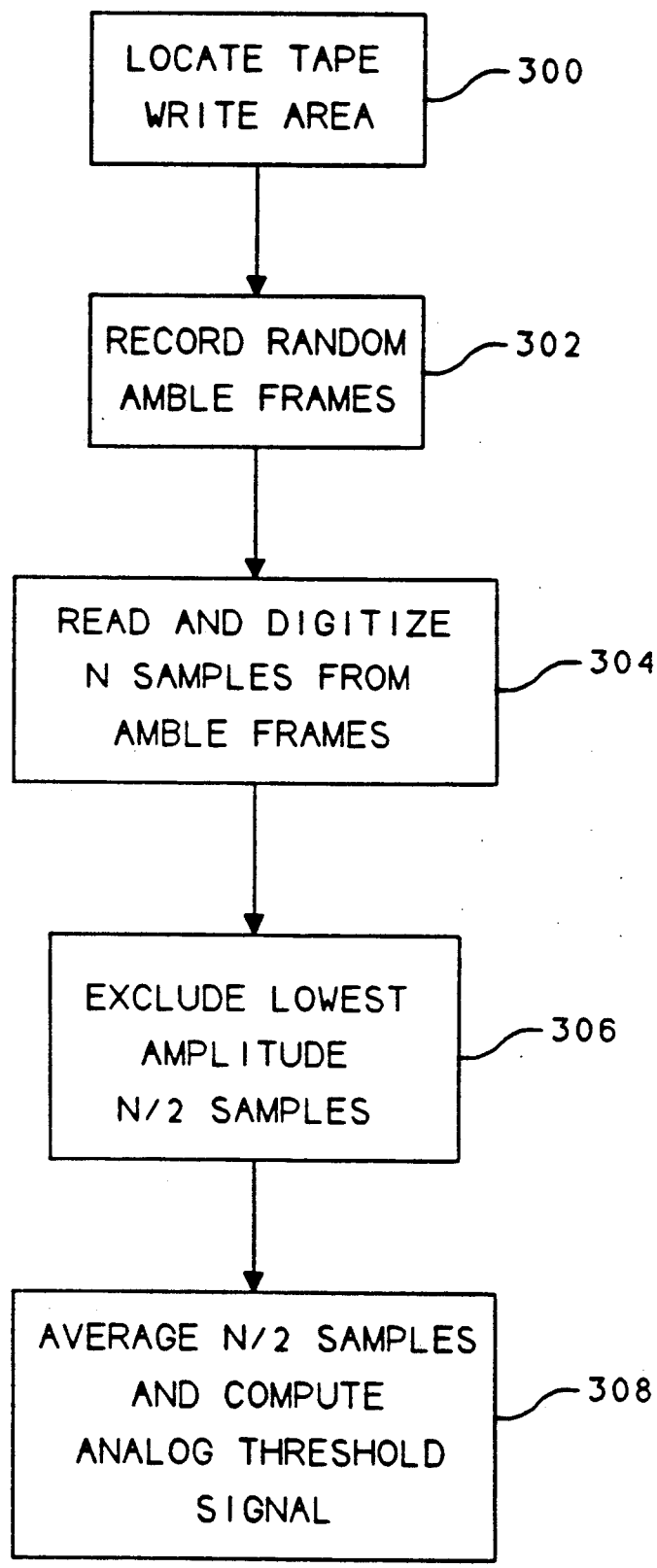
FIG. 8 illustrates a flow chart of the steps of the method of the present invention.

The foregoing method of the preferred embodiment of the present invention is illustrated in a flow chart in FIG. 8. The first step of the method, shown in block 300, is to locate the area on the tape in which the user desires to write. This is accomplished by quickly searching the indexing information in the sub-code areas of each track.

The next step, shown in block 302, is to record a plurality of amble frames. The amble frames are written with randomized test data to be used in setting the threshold. As discussed above, it is well known to one of ordinary skill in the art that the amplitude of a signal from the tape varies inversely with the frequency of the signal. Thus, the amplitude of a reproduced high frequency signal can be 50% of the amplitude of a low frequency signal written with the same signal amplitude. For this reason, the method of the present invention uses amble frames comprising randomized zeros. Since a signal containing randomized zeroes contains all frequencies, the average of the amplitudes of the zeros over several blocks represents an average amplitude. Although the pattern is described as randomized in the preferred embodiment, the randomized pattern is generated in the same manner each time using a randomizer (not shown) within the write sequencer 108 which utilizes the same starting number each time.

After each amble track is written, it is read back as part of the read-after-write process described above, as indicated in block 304. As the data is read back, the signal is input to the media flaw detector circuit 130, described above. As the amble frames are read back, N samples per track are taken by the circuit and digitized by the microprocessor 250. Since it has been found that a media flaw is unlikely to extend over more than one-half of the PCM data portion of a track, the lowest amplitude N/2 samples per track are discarded from each track to exclude the possibility of using any samples read in a media flaw area as indicated by a block 306.

Next, in a block 308, the largest amplitude N/2 samples are averaged by the microprocessor and the threshold is calculated. This average is converted from digital value to an analog signal level for use by the media flaw detector circuit 130 to determine when data is below this threshold and must be rewritten. This average represents a nominal signal amplitude for the particular tape and the particular location on the tape which is about to be written to. Since any samples which could have possibly been affected by a media flaw region have been excluded from the computation of the nominal amplitude, the nominal amplitude is unaffected by a media flaw in the amble region.

Although the threshold level can be set to any fraction of the nominal amplitude of the tape (e.g., any fraction in the range of 0.1 to 0.7), a factor of 0.5 is preferably used as it has been found to be particularly advantageous for the current technology used in the preferred embodiment. Thus, if the threshold is one-half of the nominal amplitude, any tracks read back after writing that have amplitudes less than one-half of the nominal amplitude must be rewritten. The rewriting occurs in a conventional manner in accordance with the aforementioned tape standard.

Preferably, the above-described threshold setting method is performed separately for each of the two read heads 126 and 128 to allow for any differences in the reproduction characteristics of the two read heads. The microprocessor 250 stores a separate threshold value for each read head and outputs the appropriate threshold value in synchronism with the rotation of the drum 124.

It is readily apparent to one of ordinary skill in the art that the method of the preferred embodiment of the present invention just described can be implemented in any one of several different ways. One such way is by a media flaw detector circuit 130 shown in FIG. 6.

While the present invention has been described in the context of a helical-scan recorder, clearly the technique disclosed in the present invention can be used for other magnetic media recording systems. For example, the method of the present invention can be used in ¼-inch streaming tape drives. One can generate an amble of randomized test data and then back up and recheck the recorded amble. From this read back, one can generate a threshold value. Then, one can write data on the tape and afterwards, recheck that data, comparing it with the threshold value. This comparison will indicate whether the data should be rewritten.

What is claimed is:

1. A method for selecting a threshold voltage for determining whether data written onto a magnetic recording tape in a tape drive system has a sufficient amplitude, comprising the steps of:

writing a selected data pattern on a portion of said tape to cause flux changes on said tape having amplitudes and frequencies responsive to said data pattern and responsive to the magnetic characteristics of said portion of said tape;

sensing said flux changes on said portion of said tape to generate electrical signals responsive thereto;

sampling said electrical signals to provide samples of said electrical signals, said samples having magnitudes responsive to the amplitude of said flux changes on said portion of said tape;

storing the samples of said electrical signals;

selecting a fraction of the stored samples, each selected sample having a magnitude greater than or equal to the magnitude of each sample that is not selected;

averaging the magnitudes of the selected samples to obtain an average magnitude; and setting said threshold voltage to a predetermined percentage of said average magnitude.

2. The method as defined in claim 1, wherein said step of writing a selected data pattern comprises the steps of:

passing a predetermined test pattern through a pseudo-randomizer; and writing the pseudo-randomized pattern on a portion of the tape to cause flux changes on the tape having amplitudes and frequencies responsive to the data pattern and responsive to the magnetic characteristics of the portion of the tape.

3. The method as defined in claim 1, wherein said tape drive is a digital audio tape (DAT) drive having a PCM data portion of tracks on the tape, and wherein the step of writing comprises writing the selected data pattern onto said tape in the PCM data portion of a track on said tape.

4. The method as defined in claim 1, further comprising the steps of:

storing the threshold voltage for use when the tape drive system is reading or writing user data; and providing the threshold voltage as an input to a voltage comparator when reading user data from said tape, said threshold voltage being compared with electrical signals responsive to said user data to determine whether flux changes representing said user data on said tape have sufficient amplitude to reproduce said user data.

5. A system that sets a threshold voltage for comparing the amplitude of data signals reproduced from a magnetic tape in a tape drive, comprising:

means for writing a predetermined data pattern on a tape to cause flux changes on said tape, said flux changes having amplitudes and frequencies responsive to the data and responsive to the magnetic characteristics of said portion of said tape;

means for reproducing the predetermined data pattern from the flux changes on said tape, wherein said means for reproducing the predetermined data pattern is also capable of reproducing user data written on the tape;

means for generating electrical signals having magnitudes responsive to the amplitude of the reproduced data pattern;

means for sampling said electrical signals generated when a predetermined data pattern written on the magnetic tape is reproduced to obtain samples representing the predetermined data pattern;

means for storing the samples representing the predetermined data pattern;

means for comparing the magnitude of each of the samples with other of the samples;

means for selecting a percentage of said samples, each selected sample having a magnitude greater than or equal to the magnitude of each sample that is not selected;

means for averaging the magnitudes of the selected samples and generating the threshold voltage, said threshold voltage having a magnitude responsive to the average magnitude of the selected samples;

means for storing said threshold voltage;

a comparator having a first input that receives electrical signals reproduced from user data being written on said tape and having a second input that receives said threshold voltage, said comparator generating an output signal having a first signal level when said electrical signals are greater than said threshold voltage and having a second signal level when said threshold voltage is greater than said electrical signals; and means for monitoring said output signal from said comparator when writing said user data onto the tape and generating a signal to rewrite said user data when said output signal has said second signal level.

6. The apparatus as defined in claim 5, wherein the percentage selected by the means for selecting is substantially fifty percent.

7. The apparatus as defined in claim 6, wherein the means for sampling obtains N samples, and wherein N is in the range of 40 to 500.

8. The apparatus as defined in claim 5, further comprising a pseudo-randomizer, wherein said predetermined pattern comprises a test pattern which has been passed through the pseudo-randomizer.

9. The apparatus as defined in claim 5, wherein said means for averaging determines a magnitude of said threshold voltage as a fraction of said average magnitude, wherein said fraction is in the range of approximately 0.1 to 0.7.

10. The apparatus as defined in claim 9, wherein said fraction is 0.5.

11. A method of writing data onto a magnetic tape, comprising the steps of:

(1) advancing said tape to a location where said data is to be written;

(2) prior to writing said data:

(a) writing a predetermined data pattern on said tape at said location;

(b) reproducing electrical signals having magnitudes responsive to said predetermined data pattern;

(c) sampling said electrical signals to obtain a set of values corresponding to the magnitudes of said sampled electrical signals;

(d) selecting a predetermined portion of said set of values, said predetermined portion comprising the values in said set of values with magnitudes greater than or equal to the magnitude of each of the values in said set of values that is not selected;

(e) averaging the values in said predetermined portion of said set of values to obtain an average value; and (f) generating a threshold voltage having a magnitude responsive to said average value;

(3) writing data onto said magnetic tape;

(4) reproducing electrical signals having magnitudes responsive to the data written onto said magnetic tape; and (5) comparing said reproduced electrical signals with said threshold voltage; and (6) rewriting the data onto said magnetic tape when said threshold voltage is greater than said reproduced electrical signals.

12. The method as defined in claim 11, wherein in said step of sampling the magnitudes of N samples are obtained as the set of values, and wherein in said step of selecting, said predetermined portion of said set of values comprises N/2 values.

13. The method as defined in claim 12, wherein N is in the range of 40-500.

14. A method for selecting a threshold voltage for determining whether data written onto a magnetic recording tape in a tape drive system has a sufficient amplitude, comprising the steps of:

randomizing a selected test data pattern to obtain a randomized pattern;

writing the randomized pattern on a portion of said tape to cause flux changes on said tape having amplitudes and frequencies responsive to said randomized pattern and responsive to the magnetic characteristics of said portion of said tape;

reproducing the randomized pattern to provide electrical signals responsive to the flux changes on said tape;

sampling said electrical signals to provide a sample set, said samples having magnitudes responsive to the amplitude of said flux changes on said portion of said tape;

storing the samples of said electrical signals;

selecting a portion of the stored samples, each sample in the selected portion having a magnitude greater than or equal to the average of each sample that is not selected;

averaging the magnitudes of the selected percentage of samples to obtain an average magnitude of the selected percentage of samples; and determining a threshold voltage as a predetermined percentage of said average magnitude.

* * * * *

UNITED STATES PATENT AND TRADEMARK OFFICE
CERTIFICATE OF CORRECTION

PATENT NO. : 5,081,547

DATED : January 14, 1992

INVENTOR(S) : Jones V. Howell

It is certified that error appears in the above-identified patent and that said Letters Patent is hereby corrected as shown below:

In Column 14, at line 20, change "average" to --magnitude--.

Signed and Sealed this

Eighth Day of June, 1993

Attest:

MICHAEL K. KIRK

*Attesting Officer*     Acting Commissioner of Patents and Trademarks